United States Patent [19]

Munsell

[11] Patent Number: 4,567,820

[45] Date of Patent: Feb. 4, 1986

[54] SILO BAG PACKING MACHINE

[76] Inventor: Frank E. Munsell, 6679 Mason Rd., Fowlerville, Mich. 48836

[21] Appl. No.: 579,725

[22] Filed: Feb. 13, 1984

[51] Int. Cl.$^4$ .......................... A01F 25/16; B65G 1/04
[52] U.S. Cl. ........................................ 100/65; 100/145; 100/189; 414/523; 56/341; 141/114; 141/313
[58] Field of Search .................. 100/65, 100, 145–150, 100/177, 188 R, 189, 229 R; 414/132, 526, 523, 503; 56/341, 344; 141/71, 114, 231, 313, 314; 198/558

[56] References Cited

U.S. PATENT DOCUMENTS

| | | |
|---|---|---|
| 993,294 | 5/1911 | Edison . |
| 2,158,745 | 5/1939 | Dalimata . |
| 2,661,105 | 12/1953 | Purdy .............................. 414/523 |
| 3,155,288 | 11/1964 | Landgraf . |
| 3,158,375 | 11/1964 | Vig . |
| 3,229,320 | 1/1966 | Cymara . |
| 3,348,475 | 10/1967 | Fenster et al. . |
| 3,687,061 | 8/1972 | Eggenmuller et al. . |
| 4,046,068 | 9/1977 | Eggenmuller et al. . |
| 4,256,035 | 3/1981 | Neufeldt ............................. 100/145 |
| 4,280,538 | 7/1981 | Hazelbaker . |
| 4,308,901 | 1/1982 | Lee . |
| 4,310,036 | 1/1982 | Rasmussen et al. . |
| 4,337,805 | 7/1982 | Johnson et al. . |
| 4,412,567 | 11/1983 | Kosters . |

FOREIGN PATENT DOCUMENTS 52022 2/1912 Austria .

OTHER PUBLICATIONS

Brochure entitled "Roto-Press", 22-3rd St., N.E., Sioux Center, Iowa 51250, Jun. 1983.
Brochures entitled "AG-BAG-The Affordable System"; AG-BAGGER, AG-Bag Corporation, P.O. Box 418, Astoria, Oreg. 97103.
Brochure entitled "Silopress", Silopress, Inc., USA, 1915 Floyd Blvd., Sioux City, Iowa 51104.

Primary Examiner—Peter Feldman
Attorney, Agent, or Firm—Harness, Dickey & Pierce

[57] ABSTRACT

An improved packing apparatus is disclosed for use in compacting various types of materials such as grain or green forage into large air-tight tubes or bags. The apparatus includes an auger for packing the materials which is supported in part by bearing means located outside of the material flowpath and in part by an extended section supported by the material itself thereby eliminating the possibility of material becoming entangled or jammed. A retractable conveyor assembly is also incorporated therein which may be easily moved between operating and transport positions. An optional grain loading auger is also disclosed which is particularly well suited for transfering grain or like materials from a transporter to the packing apparatus.

16 Claims, 10 Drawing Figures

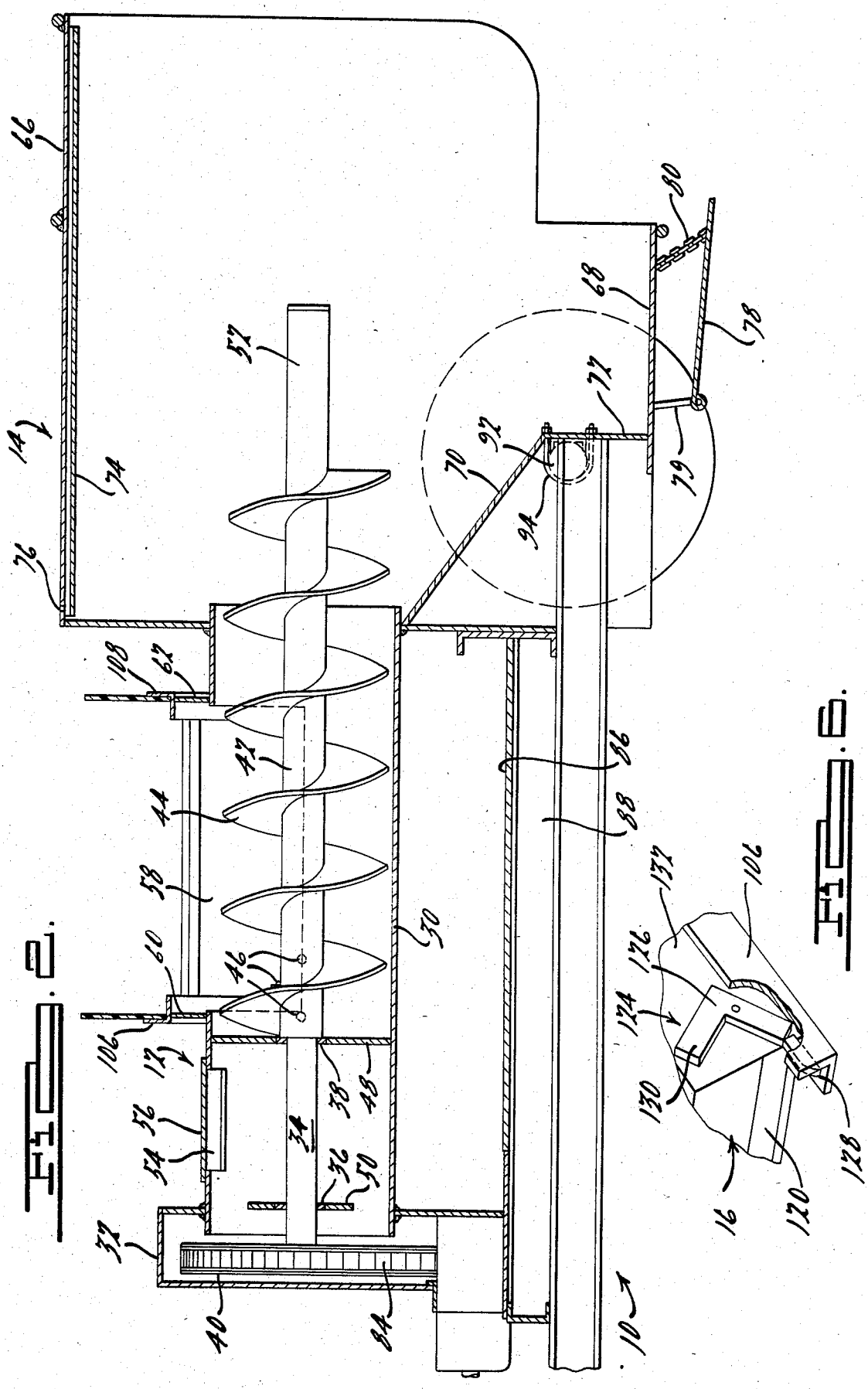

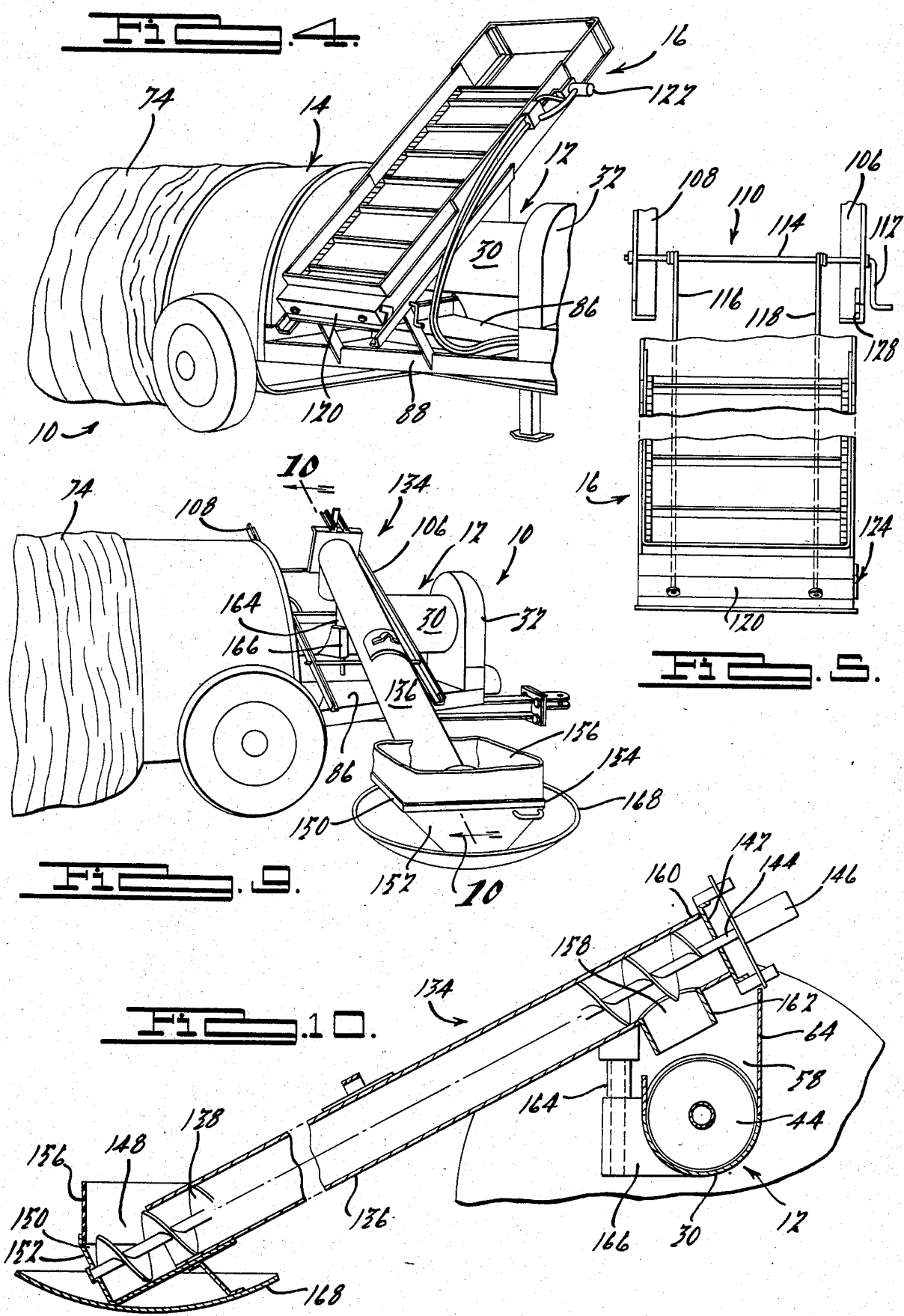

SILO BAG PACKING MACHINE

BACKGROUND AND SUMMARY OF THE INVENTION

The present invention relates generally to packing apparatus and more particularly to apparatus for use in packing various types of materials such as grain, silage, etc. in long, large plastic bags for storage.

In the past, it has been common practice to construct large cylindrical structures called silos in order to store grain, green forage or the like for use in feeding livestock over the non-growing periods such as winters and the like. However, while these structures were well suited for their intended use, they required a substantial investment in terms of the cost of construction and maintenance thereof. Further, because these structures were generally designed to be filled from the top, it was necessary for specialized blower equipment to be purchased and erected. Also, the use of such structures is often potentially hazardous because material may become jammed at a level requiring personnel to enter the silo to dislodge the jam with the attendant possibility of a sudden release of the material occurring which could then result in injury.

More recently the construction and use of silos has been replaced by the use of large diameter elongated bags generally refered to as silo bags for storage of grain and other livestock feed. Typically, these silo bags are large (on the order of about 8 feet in diameter and upwards of 150 feet long or more) plastic bags or tubes into which the material to be stored is packed after which the ends are sealed. These bags may be filled at any desired location and when the material is needed, the livestock may be allowed to feed directly from the opened bag. Hence, these silo bags offer many significant advantages in terms of capital investment and convenience of use over the prior silo structures.

The present invention is directed to an improved apparatus for use in filling of these silo bags and includes a delivery auger supported in cantilevered relationship within an elongated tube which operates to delivery material from supply means to a packing chamber from which the material exits into a silo bag carried in surrounding relationship to and by the packing chamber portion. The delivery auger includes a shaft extension which extends a substantial distance into the packing chamber whereby the material may be compacted in surrounding relationship thereto and thereby provide additional bearing support for the auger during operation thereof. This configuration not only provides for stable, trouble-free support of the auger but also eliminates the need for any supporting obstructions over the operating length of the auger thus reducing the likelihood of equipment downtime due to jamming of the flowpath as well as facilitating cleaning thereof after use of the machine. This unobstructed flowpath is particularly advantageous when fibrous material such as chopped corn or other green forage material is being packed.

In order to supply material to the delivery auger a conveyor assembly is mounted on the machine extending laterally downwardly therefrom which receives material from transport means such as a wagon or truck. The conveyor assembly is movably supported on tracks secured to the machine and includes means for retracting it from the lowered or extended position so as to reduce the overall width of the machine sufficiently to enable highway transportation thereof without requiring removal of and separate transportation for the conveyor assembly.

An optional supply auger assembly is also provided which may be removably supported on the machine and used for packing of various types of granular materials such as grain or the like. This supply auger provides a far more efficient means for supplying of such materials to the delivery auger than the conveyor apparatus heretofore utilized and may be easily attached for use.

The delivery auger and associated tube are supported over a platform provided on the machine which offers the advantage of a convenient storge space to accommodate additional silo bags. Means are also provided whereby the supporting wheel positions may be adjusted to provide for increased ground clearance and/or wider tracking which may prove to be of substantial benefit when the machine is utilized in areas of rough or uneven ground contour.

Thus as indicated above and as will be more readily appreciated from the following detailed description, the present invention provides an extremely reliable, very sturdily built, improved packing machine which is particularly well designed to provide efficient trouble-free operation and is well adapted for a wide variety of applications under both preferred and adverse conditions.

Additional advantages and features of the present invention will become apparent from the subsequent description and the appended claims taken in conjunction with the accompanying drawings.

BRIEF DESCRIPTION OF THE DRAWINGS

FIG. 2 is an enlarged longitudinal section view of the machine shown in FIG. 1, the section being taken along line 2—2 thereof;

FIG. 4 is a view similar to that of FIG. 1 but illustrating the conveyor assembly in a retracted transport position;

FIG. 5 is an enlarged fragmenatary view of the conveyor assembly illustrating means for extending and retracting same, all in accordance with the present invention;

FIG. 6 is a fragmentary detail view showing a locking arrangement for securing the conveyor assembly in a raised position for use on the machine of FIG. 1;

FIG. 9 is a perspective view of the machine of FIG. 1 with the conveyor assembly removed therefrom and the optional auger supply assembly installed in operative relationship therewith, all in accordance with the present invention; and FIG. 10 is a fragmentary longitudinal sectioned view of the auger supply assembly shown in FIG. 9, the section being taken along 10—10 thereof.

DESCRIPTION OF THE PREFERRED EMBODIMENTS

Figure 1:
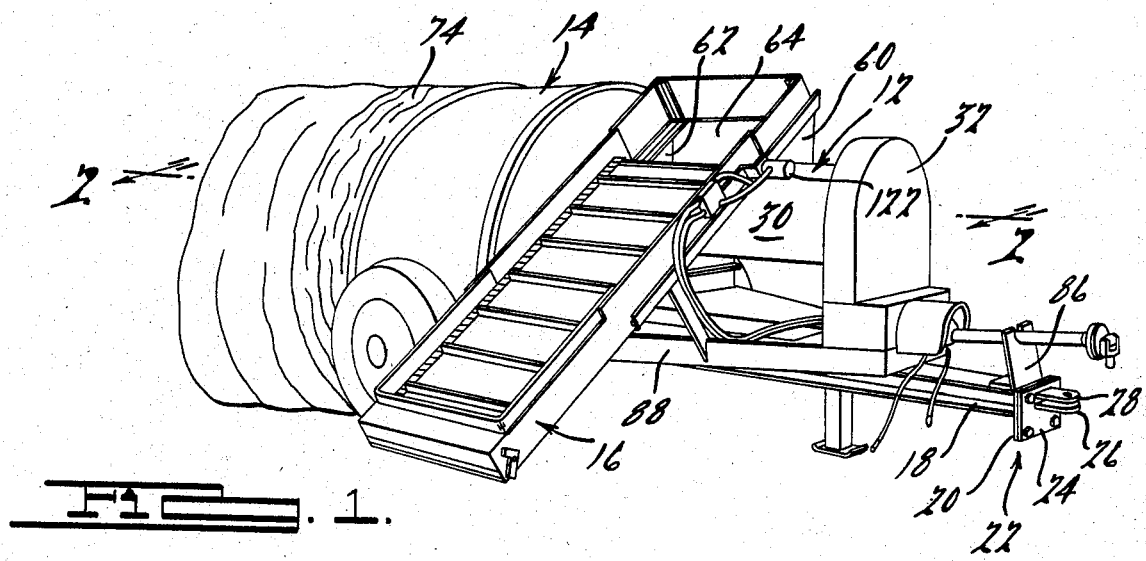
FIG. 1 is a perspective view of the packing machine of the present invention with a partially filled silo bag shown extending rearwardly therefrom.
Figure 3:
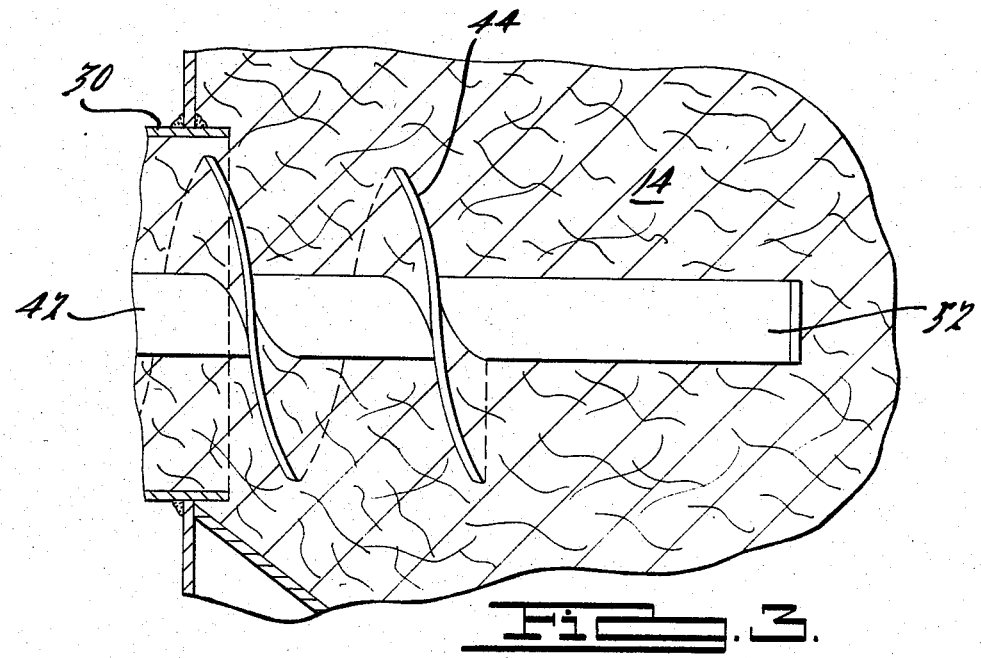
FIG. 3 is a fragmentary enlarged section view of a packing chamber portion of the machine shown in FIG. 1.

Referring now to the drawings and in particular to FIGS. 1 through 3, there is shown a silo bag packing machine in accordance with the present invention indicated generally at 10 and including a delivery portion 12 operative to convey grain, green forage or other like materials to a packing chamber 14. A conveyor assembly 16 is also provided for receiving material to be packed from suitable transport means (not shown) such as trucks or wagons and supplying the materials to the delivery portion 12.

Packing machine 10 is designed to be connected to and operated in conjunction with a suitable motorized vehicle such as and preferably a conventional farm tractor which may also be used for transporting of the mobile machine. In order to accommodate varying height draw bars on various tractors, it may be desirable to provide tongue 18 of machine 10 with a flange 20 secured thereto to which a connector assembly 22 is bolted. As seen in FIG. 1, the connector assembly comprises a flange 24 matable with flange 20 and securable thereto by means of a plurality of bolts. A pair of vertically spaced generally parallel connector flanges 26 and 28 project forwardly from flange 24 and are offset from the vertical center of flange 24. Thus, by inverting the connector assembly a wider range of tractor drawbar heights may easily be accommodated. Alternatively, tongue 18 may include a conventional hitch arrangement in lieu thereof.

As best seen with reference to FIG. 2, the delivery portion includes an elongated generally cylindrically shaped hollow housing 30 extending forwardly from the packing chamber 14 to a drive gear housing 32 secured to the forward end thereof. A drive shaft 34 is rotatably supported within a forward portion of housing 30 by means of first and second axially spaced bearing members 36, 38 and has a suitable drive gear 40 secured to a forward end thereof. Secured to the other end of drive shaft 34 is an enlarged diameter elongated shaft 42 having a single flight auger 44 secured thereto which is adapted to be rotatably driven by drive shaft 34. Preferably, shaft 42 will be hollow with an inside diameter sized to snuggly receive the end of drive shaft 34 and may be securely connected thereto by plurality of diametrically extending bolts 46. Alternatively, shafts 42 and 34 may be secured thereto by welding if desired so as to form a unitized structure.

A generally circular plate member 48 is secured within housing 30 immediately adjacent the forward end of shaft 42 and operates to separate the forward portion of the housing 30 from that portion within which the auger is disposed as well as to support shaft support bearing means 38. Preferably bearing 38 will be designed to accommodate both axial and radial thrust. A second diametrically extending plate member 50 is secured adjacent the forward end of housing 30 and supports the other shaft supporting bearing means 36. Thus, as can be seen, bearing means 36 and 38 cooperate to support shafts 34, 42 and auger 44 within housing 30 in a generally cantilevered relationship. It should be noted that as thus supported the material flowpath which extends from plate 48 rearwardly into packing chamber 14 is completely clear of any obstructions upon which material may snag or become entangled thus avoiding the possibility of jamming of the machine.

As previously mentioned, auger carrying shaft 42 extends a substantial distance beyond the end of the auger 44 and into the packing chamber 14. During operation of the machine, the packing chamber 14 will be substantially filled with the material being packed which because of the relatively highly compressed or compacted nature thereof due to operation of the auger will cooperate with the extended portion 52 of the shaft to provide additional bearing support as best seen with reference to FIG. 3.

Housing 30 also has a relatively small access opening 54 provided in the upper sidewall thereof adjacent the forward end to provide access to the bearings and the like for maintenance and/or repair. A cover member 56 is provided which is secured to housing 30 to close opening 54. A second relatively large material supply opening 58 is also provided axially rearwardly spaced from access opening 54 which is positioned in overlying relationship to the forward end of the auger 44. A plurality of upstanding flange members 60, 62, 64 may also be provided surrounding this opening 58 which operate to guide the flow of materials into the housing 30 and reduce spillage thereof. Preferably, supply opening 58 will extend approximately 180° circumferentially of housing 30 and have a substantial axial length so as to assure a rapid supply of material to the auger 44. It should also be noted that, as shown in FIG. 2, auger 44 extends a substantial distance into the packing chamber 14 to aid in assuring relatively full complete packing of the silo bag. It has also been found that because it is primarily the last flight of the auger 44 which performs the major portion of the compacting of the material, it is possible to employ lighter gauge material for formation of all but approximately the last flight and to use a heavier gauge material for this last flight to thereby reduce the overall weight and cost of the auger 44.

The packing chamber 14 comprises a generally semi-cylindrically shaped housing 66 open at the rear and having a generally flat lower surface 68 extending between the lower ends of the cylindrical or arcuately shaped sidewalls. A generally flat rearwardly inclined plate 70 extends from the juncture of the packing chamber 14 with the delivery housing 30 to a generally vertically extending wall section 72. The general contour of the packing chamber is designed to enable a silo bag 74 which is to be filled to be placed thereover and to slip off the housing without tearing or snagging as it is filled with material. In order to vent air, gases or the like from the interior of the bag as it is being filled, a generally U-shaped elongated channel member 74 is secured to the upper inner surface of housing 66. As shown in FIG. 2, channel member 74 is open at both its forward and rearward ends and is in open communication with a vent opening 76 in housing 66. Preferably, the bottom of chamber 14 will be positioned in close proximity to ground level. An adjustable belly pan 78 is also provided being hingedly secured at its forward end to the bottom of the packing chamber 14 by means of hinge members 79 and having a pair of adjustable chains 80 extending upward from opposite sides for supporting the trailing edge thereof. The purpose of the belly pan 78 is to support the bottom of the silo bag surrounding the packing chamber.

In order to rotatably drive the shafts 34 and 42 and associated auger 44, a power take off drive shaft 82 is provided which is designed to be connected to the power take off shaft conventionally provided on farm tractors or the like. Shaft 82 is drivenly connected to the shafts 34, 42 and auger 44 via a gear at its rearward end (not shown) within gear housing 32 and associated chain 84 extending between it and gear 40. Preferably, a suitable support 86 for this power take off shaft will be provided on the tongue 18 of packing machine 10 so as to provide a convenient storage location therefor and to prevent it from coming in contact with the ground. This both helps to keep the shaft clean and also prevent possible damage thereto. Alternatively, it should be noted that if desired other types of drive means may be provided in lieu of the use of a power take off drive shaft. For example, most present day farm tractors are provided with hydraulic power systems adapted to be connected to and power equipment. Accordingly, a hydraulic drive motor could be employed if desired.

As best seen in both FIGS. 1 and 2, cylindrical housing 30 is supported in overlying relationship to a generally triangular shaped platform 86 defined in part by rearwardly diverging frame members 88. Preferably an expanded metal grate will be secured to and extend between the frame members so as to provide a convenient storage space for additional silo bags or the like.

Figure 7:
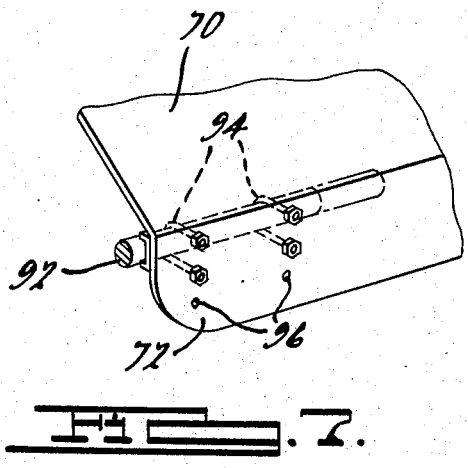
FIG. 7 is a fragmentary detail view showing the lateral wheel adjustment feature of the machine of FIG. 1.

Packing machine 10 is movably supported on a pair of suitable wheels 90 connected to axle assemblies 92 which may incorporate means whereby the tracking width and/or ground clearance of the packing machine 10 may be easily adjusted. In one embodiment shown in FIG. 7, the wheel supporting axles 92 are secured to the vertically extending wall section 72 of the packing chamber 14 via a plurality of U-bolts 94 which may be positioned in any of a plurality of suitably positioned openings 96 therein. Also, as shown in phantom in FIG. 7, each wheel is carried by an independent axle and hence may be laterally positioned at any desired location suitable for the terrain upon which the machine is to be utilized.

Figure 8:
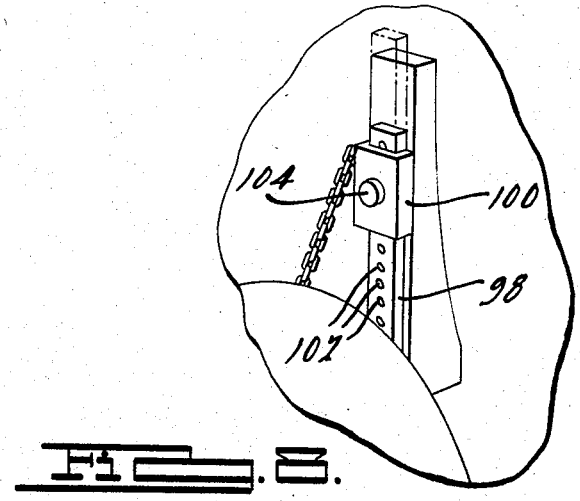
FIG. 8 is a fragmentary detail view showing means for adjusting the ground clearance of the machine of FIG. 1.

An alternative height adjustment is shown in FIG. 8 and comprises generally vertically extending bar members 98 slidably retained within suitable guides 100 secured to the sidewalls of the packing machine 10 on opposite sides thereof. In this version, the axle is secured to the lower end of bar members and supported thereby. A plurality of openings 102 are provided along the length of each bar member 98 and may be aligned with an opening in guide member 100 and secured by means of a suitable pin 104. Thus, by merely repositioning of the bar member with respect to the guide, the ground clearance of the packing machine may be set at any desired level.

In order to provide a supply of material to the delivery portion of the packing machine a conventional conveyor assembly 16 is provided as previously mentioned which is movably supported on a pair of spaced guide rails 106, 108 supportingly secured to packing machine 10. In order to raise and lower the conveyor assembly, a winch assembly 110 is provided which includes a crank handle 112 and shaft 114 which is rotatably secured to and extends between the lower ends of rails 106, 108 and includes a pair of cables 116, 118 or the like each having one end connected to the lowered edge 120 of the conveyor assembly 16. The other ends of cables 116, 118 are secured to shaft 114 and designed to be taken up in response to rotation of crank handle 112. Thus, by rotation of the crank handle 112 and associated shaft 114, the cables 116, 118 may be wound up or played out thereby effecting a raising or lowering of the conveyor assembly 16 along guide rails 106, 108. Conveyor assembly 16 as shown is designed to be driven by a hydraulic motor 122 which receives hydraulic power from the tractor or other tow vehicle.

This represents an important feature of the present invention because when the conveyor assembly 16 is in an extended operative position the overall width of packing machine 10 is in excess of the maximum width allowed for vehicles travelling on most highways. Accordingly, the ability to easily extend and retract the conveyor assembly of the present invention enables the operator to more conveniently transport the machine from one location to another without having to partially disassemble the apparatus.

A latch means 124 is also provided to secure the conveyor assembly 16 in a raised or retracted position. As best seen with reference to FIG. 6, a latch member 126 is pivotably mounted to preferably one or alternatively both sides of conveyor assembly 16 adjacent the lower edge 120 thereof and is operative to releasably engage a flange block or other abutment portion 128 secured to the leading or lower edge of guide rail 106 when the conveyor is in a raised or retracted position. In order to lower or extend the conveyor assembly 16, it is only necessary to pivot the latch member 126 out of engagement with the abutment portion 128 on the rail 106 and extend or lower the conveyor slightly so as to pass the latch member 126 beyond the abutment portion 128. A suitable actuating handle or lever 130 may be provided on latch member 126 if desired to facilitate operation thereof. Also, as shown in FIG. 6, sufficient clearance between upstanding portion 132 and rail 106 will be provided to enable conveyor assembly to clear abutment portion 128. It should be noted that if preferred a suitable bar or rod may also be used extending between openings in the guide rails 106, 108 which may be positioned to lock the conveyor in the raised position and effectively block lowering movement thereof or latch member 126 may be pivotably secured to rail 106 with abutment portion being provided on conveyor assembly 16. In any event, this arrangement provides a convenient and effective means whereby the conveyor means 16 may be moved to a retracted position thereby reducing the overall width of the packing machine 10 to enable highway transporting of same without requiring removal and separate transportation for the conveyor.

In operation, the packing machine 10 will be connected to a tractor or other suitable vehicle which may also operate to provide power via a power take off drive and/or via the tractor hydraulic power system to the packing machine 10. The conveyor is in an extended position and a silo bag to be filled is slid over and supported by the packing chamber 14. A supply of material to be packed such as a green forage material is then transported to the packing machine via a wagon, truck or by other such means and unloaded onto conveyor assembly 16. Conveyor assembly 16 will then carry the material upwardly and discharge it into the delivery means through opening 58 in housing 30. The rotating auger 44 will then operate to transfer the material rearwardly through the unobstructed path defined by housing 30 and into packing chamber 14. Initially the material will merely be deposited within packing chamber 14 filling the relatively large space. However, as the space therein becomes filled, the last flight of the auger 44 will continue forcing material therein thereby compacting the material. As a continuing supply of material is fed into packing chamber, previously compacted material will be forced outwardly from the open rear of packing chamber 14 and into the surrounding silo bag thereby filling same. This operation will continue with the filled bag being deposited on the ground behind the packing machine. This continuing action will operate to force the packing machine and associated vehicle to which it is attached forwardly over the ground and thus the degree of compaction of the material within the bag may be easily controlled by applying a braking force against this forward movement. Typically this may be accomplished by merely setting the brakes of the towing vehicle, however, it may in some cases also be desirable to provide independent mechanical or hydraulic brakes on the packing machine itself to operate in lieu of or in addition to the tow vehicle braking system.

Referring now to FIGS. 9 and 10, there is shown an optional auger supply apparatus 134 which is particularly well suited for use in packing of granular materials such as grain or the like.

Auger supply apparatus 134 comprises an elongated generally cylindrically shaped housing 136 within which an elongated auger 138 is rotatably positioned. The opposite ends of housing 136 are closed by means of suitable flange members 140, 142 secured thereto which also carry suitable bearings for rotatably supporting the opposite ends of the auger 138. The upper (as shown) shaft end 144 of the auger 138 extends outwardly through flange 142 and is drivenly connected to suitable drive means 146 such as for example a hydraulic motor which will operate to rotatably drive auger 138. While as shown, drive motor 142 is directly coupled to upper shaft end 144, it may be preferable to employ gear reduction means therebetween thereby enabling use of a smaller capacity motor which may be more readily operated by the hydraulic systems conventionally provided on farm tractors. An inlet 148 is provided at the lower end of housing 136 and is preferably surrounded by outwardly flared flange members 150, 152, 154 secured thereto which define a hopper for receiving the granular material from suitable transport means and delivering same to the auger 138. Preferably a flexible boot 156 of suitable plastic or rubber extends around the periphery of the upper open end of the thus defined hopper. Boot 156 enables the capacity of the hopper to be increased yet will resiliently deflect in the event of engagement with the transparent means during unloading thereof.

An outlet opening 158 is also provided at the upper end 160 of the housing to which a relatively short cylindrical discharge tube 162 is secured to direct the flow of material into the inlet opening 58 of the delivery portion 12 of the packing machine 10.

The auger supply apparatus 134 is designed to be pivotably supported by means of a pivot pin or rod 164 and associated receiving bracket 166 secured to the sidewall of housing 30 on the packing machine. Also a dished plate member 168 is secured to and supports the lower end of the apparatus 134 on the ground.

In operation, as the granular material is fed into the auger supply apparatus 138, it will be transfered upwardly and deposited in the delivery portion 12 by the auger 138. The delivery portion 12 will then proceed to transport the material to and pack same in the packing chamber 14 in similar manner to that described above with reference to the operation of the conveyor assembly 16. As the packing continues, the packing machine 10 will be moved forwardly, however, because the auger supply apparatus 138 is pivotably supported thereby, the lower inlet opening 148 may remain in a fixed location until the transport means has been fully emptied thereby eliminating the need to continuously reposition the transport means. This is particularly advantageous when the transport means is of the type designed for rear unloading and must back up to the hopper to unload. Once the transport means has been fully unloaded the auger supply apparatus may be pivoted by sliding the lower end thereof forwardly over the ground to an advanced position in preparation for positioning of the next transport means to be unloaded. The provision of the dished plate member 168 supporting the lower end of the auger supply apparatus 134 facilitates this sliding repositioning movement thereof and suitable handle means 170 are provided thereon to assist in this repositioning.

Thus, as may now be appreciated, the present invention provides an extremely efficient ruggedly built apparatus for packing various types of material into silo bags. It is not only well suited for use with a wide variety of materials but is also designed for easy maintenance and cleaning thereby minimizing downtime.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. Apparatus for packing materials into a horizontal silo bag comprising:
   mobile supporting means;
   means defining a packing chamber supported on said supporting means;
   delivery means supported on said supporting means, said delivery means being operative to receive material to be packed and to transport said material to and compact said material in said packing chamber, said delivery means including:
   an elongated generally cylindrical housing having an inlet opening in the sidewall intermediate the ends thereof, one end of the said housing opening into said packing chamber and a partition within said housing positioned adjacent said opening and cooperating with said housing to define a flowpath portion for said material from said opening into said packing chamber and a support section;
   an elongated shaft extending through said partition and having a helical auger secured thereto within said flowpath portion and extending over an axial length less than the length of said shaft;
   a pair of axially spaced bearing means for rotatably supporting said shaft adjacent one end thereof within said housing, said one end being at least partially disposed within said support section;
   said auger and said shaft extending beyond said one end of said housing with the other end of said shaft extending a substantial distance beyond the end of said auger, said auger being operative to transport said material from said opening in said housing to said packing chamber and to compact said material therein in close surrounding relationship to said other end of said shaft whereby said compacted materials provide additional bearing support to said other end of said shaft.

2. An apparatus as set forth in claim 1 further comprising supply means for transporting material from a source to said delivery means.

3. An apparatus as set forth in claim 2 wherein said supply means comprise conveyor means movably supported on said delivery means.

4. An apparatus as set forth in claim 3 wherein said conveyor means is movable between an extended operative position wherein the discharge from said conveyor means is positioned in overlying relationship to said inlet opening to a retracted transporting position for facilitating transporting of said apparatus.

5. An apparatus as set forth in claim 4 further comprising winch means on said apparatus for effecting movement of said conveyor means between said extended and retracted positions.

6. An apparatus as set forth in claim 5 further including latch means cooperating with said conveyor means to lock same in a retracted position.

7. An apparatus as set forth in claim 2 wherein said supply means include an elongated generally cylindrical housing having an auger inlet opening at one end thereof and an outlet opening adjacent the other end and positioned in overlying relationship to said inlet opening of said delivery means, auger means rotatably supported within said housing and operative to transport material to be packed from said auger inlet opening to said outlet opening, said auger supply means being supported for pivotal movement with respect to said delivery means.

8. An apparatus as set forth in claim 7 wherein said auger means of said supply means is rotatably supported by bearing means at opposite ends thereof, said supporting bearing means being positioned outside of the material flowpath between said inlet and outlet whereby a substantially unobstructed flowpath is provided between said supply means inlet and outlet.

9. An apparatus as set forth in claim 7 wherein said one end of said cylindrical housing has a ground engaging dished member secured thereto, said dished member being operative to facilitate sliding movement of said one end of said housing over said ground.

10. An apparatus as set forth in claim 1 wherein said partition comprises a plate member within said housing, said plate member being operative to limit movement of material entering said delivery means through said inlet opening away from said packing chamber.

11. An apparatus as set forth in claim 10 wherein one of said plurality of bearing means is supported within said plate member.

12. An apparatus as set forth in claim 1 wherein said packing chamber is defined by a generally arcuately shaped elongated wall surface and includes longitudinally extending venting means on an upper interior surface thereof.

13. An apparatus as set forth in claim 12, wherein said vent means comprise a channel secured to said interior surface and an opening extending through said wall surface.

14. An apparatus as set forth in claim 1 wherein said mobile supporting means comprise axle and wheel assemblies and said apparatus further includes means for adjustably positioning said axle and wheel assemblies with respect to said apparatus.

15. An apparatus as set forth in claim 1 further comprising platform means positioned below said delivery means, said platform means providing storage space on said apparatus.

16. Apparatus for packing materials into a horizontal silo bag comprising:
mobile supporting means;
means defining a packing chamber supported on said supporting means;
delivery means supported on said supporting means, said delivery means being operative to receive materials to be packed and to transport said material to and compact said material in said packing chamber, said delivery means including
an elongated generally cylindrically shaped housing having an inlet opening provided in the sidewall thereof intermediate the ends thereof, one end of said housing opening into said packing chamber;
an elongated shaft having a helical auger secured thereto rotatably supported adjacent one end thereof within said elongated housing, said helical auger extending over an axial length less than the length of said shaft;
said auger and said shaft extending beyond said one end of said housing and into said packing chamber with said shaft extending a substantial distance into said packing chamber beyond said helical auger, said auger being operative to transport said material from said opening in said housing sidewall to said packing chamber and to compact said material therein in close surrounding relationship to said shaft whereby said compacted materials provide additional bearing support to said shaft; and
elongated conveyor means movably supported on said supporting means, said conveyor means being linearly reciprocably movable in a direction parallel to the longitudinal axis thereof between an extended operative position and a retracted travel position.

* * * * *